United States Patent [19]

Tatz

[11] Patent Number: 5,048,208
[45] Date of Patent: Sep. 17, 1991

[54] CD CASE CLIP HANDLER

[76] Inventor: Eli Tatz, 134 W. 58th St., New York, N.Y. 10019

[21] Appl. No.: 420,754

[22] Filed: Oct. 12, 1989

Related U.S. Application Data

[63] Continuation-in-part of Ser. No. 334,158, Apr. 6, 1989, abandoned.

[51] Int. Cl.$^5$ .............................................. G09F 3/00
[52] U.S. Cl. ...................................... 40/312; 40/641; 40/340
[58] Field of Search ................ 40/312, 641, 642, 359, 40/340

[56] References Cited

U.S. PATENT DOCUMENTS

| | | | |
|---|---|---|---|
| 1,193,265 | 8/1916 | Honecker | 40/641 |
| 1,375,619 | 4/1921 | Vaughn | 40/641 |
| 3,438,143 | 4/1969 | Wolfersberger, Jr. | 40/641 |
| 4,630,385 | 12/1986 | Swim | 40/340 |

FOREIGN PATENT DOCUMENTS

| | | | |
|---|---|---|---|
| 108670 | 1/1968 | Denmark | 40/642 |
| 1536596 | 6/1970 | Fed. Rep. of Germany | 40/641 |
| 45809 | 9/1958 | Italy | 40/641 |
| 462777 | 11/1968 | Switzerland | 40/359 |
| 1138809 | 1/1969 | United Kingdom | 40/641 |

Primary Examiner—James R. Brittain
Assistant Examiner—J. Hakomaki

[57] ABSTRACT

A clip for use with a CD case is made of a single strip of bent metal to form top and bottom plates that engage the top and bottom surfaces of the ridge of a CD case. A connecting plate is connected between the top and bottom plated and engages against a rear surface of the ridge. An angled flange connected to the leading edge of the top plate engages onto a front surface of the ridge for holding the clip to the ridge. A tab plate extends rearwardly of the connecting plate and is co-planar with the bottom plate to serve as a grasping tab for grasping the case and removing it from a collection of like CD cases which can be stored one immediately next to the other.

7 Claims, 1 Drawing Sheet

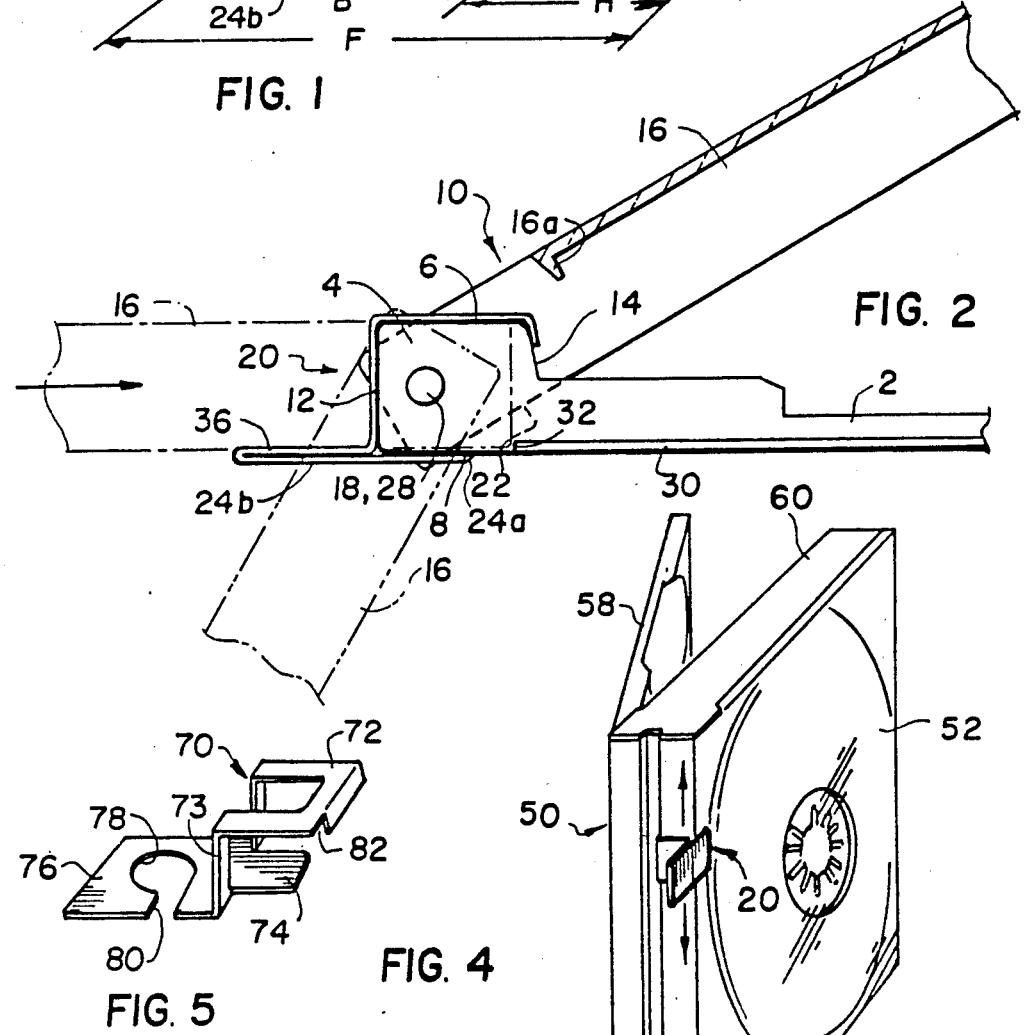

CD CASE CLIP HANDLER

CROSS-REFERENCE TO RELATED APPLICATION

This is a continuation-in-part of U.S. patent application Ser. No. 07/334,158, filed Apr. 6, 1989.

FIELD AND BACKGROUND OF THE INVENTION

The present invention relates in general to CD or compact disc cases, and in particular to a new and useful clip for aiding in the handling, organization and labeling of CD cases.

Since the advent of commercially available compact discs or CD's, it has been conventional to store CD's within a specially constructed case or housing having a first or main housing part with an indentation for receiving the CD, and a second housing part which is usually transparent and which is hinged to the first housing part. The second housing part usually has end ears at its sides with inwardly projecting pins that can be engaged into holes at opposite ends of a rear ridge portion of the first housing part. The second housing part which forms a lid or cover for the first housing part can be pivoted into a closed position for totally confining the CD within the protective case.

It is also conventional to make the lid of transparent material and to provide the lid with a channel for receiving a printed card carrying text and graphics describing the CD.

Although the hinge between the lid and the main housing part of a conventional CD case is design to open through only 180°, after repeated opening and closing of the CD case, the lid often wears to the extent that it opens by more than 180°. This often results in the printed card sliding out of the channel in the lid.

Another problem with conventional CD cases comes up particularly where one owns tens or hundreds of CD's, and wishes to store the CD's in a manner which conserves space while at the same time permitting free access to each CD. Since the rear ridge of the CD cases very narrow, there is very little room for any labeling. It is usually conventional to store CD cases in a vertically oriented position with one case next to the other in a row. Due to the narrow dimensions of the cases, it becomes very difficult to grab onto a single case and slide it out from between adjacent cases. To solve this problem, storage facilities for CD cases usually include spacers between adjacent cases. While this makes it somewhat easier to extricate a case from the storage facility, it also represents a waste of space.

In addition to the type of case described above, which is adapted for a single CD, double cases are available which comprise a pair of main housing parts which are pivoted to a central housing part. Two or three CD's can be stored within this type of double case. In construction, the double cases are similar to two single cases where the lid for each single case is replaced by the central housing part.

While the double case is somewhat easier to manipulate due to its thicker size, it cannot be stored in a compartmentalized storage facility which is designed for single cases.

A clear need thus exist for some mechanism for labeling, organizing and manipulating CD cases whether they are of the single or of the double case variety.

SUMMARY OF THE INVENTION

The present invention comprises a clip which can be used for either single or double CD cases, and which eliminates many of the existing disadvantages in handling, labeling and storing CD cases.

According to the present invention, the clip is meant for use with a CD case having a first housing part with a rear ridge having a substantially rectangular cross-section with a top surface, a bottom surface, a rear surface and a front surface. The case has a second housing part which is hinged to the ridge of the first housing part. The clip comprises a bottom plate with a leading edge. The bottom plate is for engagement with the bottom surface of the ridge. A top plate which is spaced from the bottom plate also has a leading edge and is meant for engagement with the top surface of the ridge. A connecting plate connects the top and bottom plate to each other at a location spaced from the leading edges thereof. The connecting plate is meant for engagement against the rear surface of the ridge. Tab means are connected to the connecting plate and extend rearwardly thereof and rearwardly of the ridge so that the tab can be grasped to remove the case from a row of cases. The clip comes in six colors which can be used as a labeling system for the cases.

Advantageously the bottom plate has a beveled leading edge so that a CD case with clip can easily be slipped into the space between two adjacent CD cases. The leading edge of the top plate is provided with an angled flange for engagement with the front surface of the ridge to positively hold the clip to the ridge.

Another advantageous feature of the invention is to form the tab means of a tab which is substantially coplanar with the bottom plate. In this way the second housing part which forms the lid of the case, can only be pivoted through approximately 180° until it engages the tab of the clip. This avoids excessive wear on the hinge which eventually leads to the situation where the lid pivots by more than 180°, whereby the printed card held in the channel of the lid slides out of the channel and onto the floor.

Another advantageous feature of the invention is to construct the plates and tab from a single strip of metal which is bent to form the various parts of the clip. In this way the clip can be manufactured inexpensively and in mass production. The metal is strong enough so that the case can actually be supported by holding the tab, with the case extending horizontally.

Color coding can be used to identify different broad categories of music. The metal of the clip is coated with color baked on enamel. The metal may also be a gray color. A total of seven categories can be identified, corresponding to the six colors plus the gray color of the uncoated clip. The broad categories of music such as rock, jazz, classical, foreign and miscellaneous can thus easily be distinguished from each other.

By constructing the clip so that it can slide along the ridge, another mechanism for identifying the different categories of music is by positioning the tab either at one end of the case, the opposite end of the case, or somewhere in between the ends of the case. In this way a clear visual indication is provided at the rear surface of the case to indicate the class of music contained on the CD in the case. All classical CD's can have their tab at the top, for example.

Accordingly an object of the present invention is to provide a clip for use with a CD case which improves labeling, organization and handling of the CD's stored in the cases.

Another object of the invention is to provide a CD case clip which is simple in design rugged in construction and economical to manufacture.

The various features of novelty which characterize the invention are pointed out with particularity in the claims s annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of the clip in accordance with the present invention for use with a CD case;

FIG. 2 is a side elevational view of FIG. 1, partly showing a partly open CD case for use with the clip;

FIG. 3 is a bottom plan view of the clip of FIG. 1;

FIG. 4 is a perspective view showing a clip constructed according to the present invention, in engagement with a double case for CD's; and FIG. 5 is a view similar to FIG. 1 of another embodiment of the invention.

DESCRIPTION OF THE PREFERRED EMBODIMENT

Referring to the drawings in particular, the invention embodied in FIGS. 1 and 2 thereof comprises a clip generally designated 20 for engagement with the ridge 4 of a CD case generally designated 10. CD case 10 comprises a first or main housing part 2 which carries ridge 4. Ridge 4 as a substantially rectangular cross-section with a top surface 6, a bottom surface 8, and a rear surface 12. Ridge 4 also has a front surface 14 which faces and is spaced slightly from a strip 16a of a second housing part or lid 16. Front surface 14 also extends down to a portion of housing part 2 for receiving a compact disc or CD.

Terms such as "top", "bottom" and "rear", are used only as relative terms and are not limited, in an absolute sense, to a special orientation for the case or the clip.

Case 10 includes the second housing part or lid 16 which has ears 22 which each carry an inwardly extending pin 28 which extends into the end openings 18 found on opposite ends of the ridge 4. Lid 16 can pivot from a position covering and closing the first housing part 2, through approximately 180° to a position shown in dot-dash line in FIG. 2. In normal use, the open position of lid 16 is limited by a side ledge 30 of part 2, which has a front edge 32 that engages an edge of the ears 22 on either side of the ridge 4. After opening and closing a case many times, the various parts of the case often become worn so that the edge of the ears 22 fail to engage with the edge 32 of ledge 30. This permits lid 16 to rotate by more than 180° (into the double-dot-dash position of FIG. 2). Any paper work or card held within the lid in this position, can slide out of the lid and onto the floor. Aside from being an annoyance, permitting the lid to rotate by more than 180° also further wears out the various parts of the case, which are conventionally made of inexpensive plastic.

To solve this and other problems which exist with conventional CD cases, the clip 20 of the present invention comprises a bottom plate 24 which is meant for engagement over the bottom surface 8 of the ridge 4.

Clip 20 includes a top plate 26 which is spaced away from the bottom plate 24 and which is connected to the bottom plate by a connecting plate 34. Connecting plate 34 is connected between the top and bottom plates at a location space rearwardly of leading edges of top and bottom plates. The leading edge 24a of bottom plate 24 is advantageously rounded to avoid injury to the fingers and to help facilitate engagement of the clip onto the ridge of the CD case.

As shown in FIG. 2, the leading edge 24a of the bottom plate 24 is also beveled. This makes it easier to slide the CD case into the space between adjacent CD cases where the CD cases can be stored one immediately next to the other without any large spaces between. This makes for a much more compact manner of storage for the CD cases while still permitting full access to all of the cases. The bevel is straight and does not extend around the rounded corners of edge 24a.

The leading edge of top plate 26 is provided with an angled flange 26a which engages partly over the front surface 14 of ridge 4. This produces a positive lock between the clip 20 and the ridge 4.

A tab plate 36 is connected to a lower edge of connecting plate 34 and extends over a projection 24b of the bottom plate 24. Tab plate 36 and projection 24b form tab means which extend rearwardly of the clip and rearwardly of the ridge 4. The tab means can easily be grasped between the fingers so that a CD case which is stored in a row of CD cases, can easily be identified and withdrawn from the row of cases.

With tab 36 extending horizontally, top plate 26 advantageously extends downwardly and inwardly by 5° with respect to the horizontal. In likewise fashion, the portion of bottom plate 24 which extends under top plate 26, extends inwardly and upwardly 5° from the horizontal. This accommodates cases which have ridges that are slightly thinner, so that the single clip can be used for different cases. The inward bending of the top and bottom plates closes the clip to firmly grip the CD case. The diagonal dimension from the edge 24a to the edge of flange 26a is advantageously 11 mm to provide enough space for engaging the clip onto the ridge of any CD case.

Advantageously the entire clip can be made of a single piece of metal strip material. Untempered spring steel can advantageously be used which, after being bent to the appropriate shape, is tempered to provide extra strength to the clip. The steel thickness may be anywhere from about 0.356 mm to 0.381 mm.

As shown in FIG. 1, the projection 24b of the bottom plate 24 is connected at a first bend 25 to the tab plate 36 which is superimposed on a projection 24b. Tab plate 36 is connected at a second bend 37 to the connecting plate 34 which in turn is connected at a third bend 39 to the top plate 26. Flange 26a is connected to the top plate at a fourth bend 41.

This thickness of steel provides enough strength to the clip so that a CD case can actually be held in the horizontal position simply by grasping onto the tab means.

Various dimensions for the various parts of the clip are identified in FIG. 1 as A through H. To conform to the conventional ridge 4, advantageous measurements for these dimensions are as follows:

A = 8 mm
B = 6.5 mm
C = 10 mm
D = 13 mm

E=12 mm
F=11 mm
G=2 mm
H=4.5 mm

The overall length of clip 20 is 20 mm.

These dimensions have been found by the inventor to be optimum for closely and firmly engaging the ridge 4 while providing a tab of practical size even if the ridge varies in width by 1 or 2 mm as sometimes happens in different CD cases.

The width and length (AB) of the tab shown in FIG. 1 is critical for maximum comfort and convenience. If a tab is larger, it becomes more difficult to grasp the tab when a CD case is to be removed from a row of CD cases positioned one next to the other. The 2 mm height of flange 26a (dimension G) is also critical. The inside dimension of flange 26a is less than 2 mm. This size is important in permitting the clip to be engaged to CD cases, particularly where the clip is to be used in conjunction with a double case as shown in FIG. 4. The angle between flange 26a and the top plate 26 is 112°. This is also important to mimic the inclination of front surface 14 of ridge 4, as shown in FIG. 2.

The use of an 8 mm wide clip is particularly advantageous in view of the fact that the ridge 4 of a standard CD case tape is 121 mm long. With an 8 mm wide clip, about 12 clips can be positioned along the ridge. While this is not necessary for the present invention, it does provide a convenient and attractive mechanism for storing extra clips. Clips can in fact be supplied to customers in a CD case which has the ridge structure of the CD cases shown in the figures, but which is narrower so as to store a plurality of clips rather than the conventional compact disc.

The tab means can also have a hole therethrough so that, with the clips at the bottom of each case, and a rod extending through the holes, each case can be pivoted down away from the row of cases. In this position, the disc can be removed without disconnecting the case from the rod.

FIG. 4 shows how the clip 20 can be used with a double CD case generally designated 50. The double CD case has two ridges 54 and 56 which are spaced from each other by a small distance that is sufficient to allow each housing half 52 and 58 to pivot on a central housing portion 60. Clip 20 can be slid to either end of the ridge 56 in the direction of the arrows. This is also possible when the clip is used with a single case 10.

With the clip in place, the housing half 58 can still pivot through 180° while the housing half 52 is confined to pivoting through 90° only.

To install a clip onto the ridge of a single or double case, one engages the flange 26a on the top surface 6 and holding the clip plates 24, 26 parallel to the surfaces 6,8, pushes the clip straight in the direction of the arrow in FIG. 2, onto the ridge. This is made easier since bottom plate 24 is slightly shorter than top plate 26. It is also most helpful to open the lid slightly before pushing the clip to open up the space between the front wall 14 and the strip 16a. This is true for the double case also.

FIG. 5 shows the hole 78 in clip 70. Clip 70 is an embodiment of the invention which, like the clip of FIG. 1, can be made of a single piece of material. A hole is punched in the top plate 72 and connecting plate 73 which forms bottom plate 74 which stays co-planar with the tab 76. Hole 78 may also be opened by a radial slot 80 to form a hook structure so that the CD cases can be hooked onto and removed from a rod. Another feature of FIG. 5 is the presence of a notch 82 in the flange of the top plate 72. This notch is selected to have a width approximately the same as the width of ears 22 on the case lid 16 (illustrated in FIG. 2). With this notch 82 in clip 70, the clip can be moved all the way to the end of the case and a part of the top plate 72 can engage over the ear to prevent the lid from opening. The clip can thus function as a safety lock for keeping the lid closed, if desired. The features of FIG. 5, such as the hole 78, slot 80 and notch 82 can also be used with the embodiment of FIG. 1. In likewise fashion the bottom plate 74 can have a front edge which is beveled, and include corners that are rounded, as in the embodiment of FIG. 1.

While a specific embodiment of the invention has been shown and described in detail to illustrate the application of the principals of the invention, it will be understood that the invention may be embodied otherwise without departing from such principals.

What is claimed is:

1. A clip for use in combination with a CD case having a first housing part with a rear ridge having a substantially rectangular cross-section, a top surface, a bottom surface, a rear surface and a front surface, the CD case also have a second housing part hinged to the ridge of the first housing part, the clip comprising a one-piece member made of a single piece of metal strip material and having: a planar bottom plate (24) with a leading edge (24a) for engagement with the bottom surface of the ridge; a planar top plate (26) spaced from said bottom plate, said top plate having a leading edge for engagement with the top surface of the ridge; a planar connecting plate (34) connected between said top and bottom plate at a location spaced from said leading edge; a planar tap plate (36) connected at a first bend (25) to said bottom plate and connected to said connecting plate at a second bend (37), said bottom plate having a planar projection (24b) extending under, adjacent and parallel to said tab plate, said tap plate and projecting extending rearwardly of said leading edges for extending rearwardly of the rear surface of the ridge, said connecting plate being connected to said top plate at a third bend (39); and a planar angled flange (26a) connected at a fourth bend (41) to said leading edge of said top plate for extending toward said bottom plate and engaging the front surface of the ridge to retain the clip on the ridge; said bottom plate having a portion carrying said leading edge (24a) of said bottom plate and extending forwardly of said second bend (37), said top plate (26) extending at a small angle inwardly toward said portion of said bottom plate and said portion of said bottom plate being shorter than said top plate.

2. A clip according to claim 1 wherein said leading edge of said bottom plate is beveled and has rounded corners.

3. A clip according to claim 1 wherein said portion of said bottom plate extends at a small angle inwardly toward said top plate, said small angles comprising approximately 5°.

4. A clip according to claim 3 wherein said flange extends at approximately 112° from a plane containing said top plate, toward said bottom plate.

5. A clip according to claim 1 wherein said metal material has a thickness about from 0.356 mm to 0.381 mm.

6. A clip according to claim 1 wherein said top plate has a length from its leading edge of approximately 12 mm, said connecting plate having a length between said top and bottom plates of approximately 10 mm.

7. A clip according to claim 6 wherein the angled flange connected to said leading edge of said top plate extends at an angle to said top plate for engagement with the front surface of the ridge, said flange having a width from said leading edge of said top plate, of approximately 2 mm.

* * * * *